US007702094B2

(12) United States Patent
Wesen et al.

(10) Patent No.: US 7,702,094 B2
(45) Date of Patent: Apr. 20, 2010

(54) METHOD OF STORING INFORMATION WITHIN AN ACD

(75) Inventors: Dave Wesen, Channahon, IL (US); Mike Hollatz, Huntley, IL (US)

(73) Assignee: Aspect Software, Inc., Lombard, IL (US)

( * ) Notice: Subject to any disclaimer, the term of this patent is extended or adjusted under 35 U.S.C. 154(b) by 1239 days.

(21) Appl. No.: 10/999,426

(22) Filed: Nov. 30, 2004

(65) Prior Publication Data

US 2006/0115074 A1    Jun. 1, 2006

(51) Int. Cl.
*H04M 3/06* (2006.01)
(52) U.S. Cl. .................. 379/265.09; 370/352; 370/465; 379/266.01; 386/125; 709/219
(58) Field of Classification Search . 379/265.01–266.1; 370/352, 465; 386/125; 709/219
See application file for complete search history.

(56) References Cited

U.S. PATENT DOCUMENTS

| | | | |
|---|---|---|---|
| 4,497,979 A * | 2/1985 | Phelan ....................... 379/244 |
| 5,555,179 A | 9/1996 | Koyama et al. |
| 5,765,033 A | 6/1998 | Miloslavsky |
| 5,926,539 A | 7/1999 | Shtivelman |
| 5,946,387 A | 8/1999 | Miloslavsky |
| 5,953,332 A | 9/1999 | Miloslavsky |
| 5,953,405 A | 9/1999 | Miloslavsky |
| 6,002,760 A | 12/1999 | Gisby |
| 6,021,428 A | 2/2000 | Miloslavsky |
| 6,044,145 A | 3/2000 | Kelly et al. |
| 6,044,368 A | 3/2000 | Powers |
| 6,067,357 A | 5/2000 | Kishinsky et al. |
| 6,108,711 A | 8/2000 | Beck et al. |
| 6,138,139 A | 10/2000 | Beck et al. |
| 6,167,395 A | 12/2000 | Beck et al. |
| 6,170,011 B1 | 1/2001 | Beck et al. |
| 6,175,563 B1 | 1/2001 | Miloslavsky |
| 6,175,564 B1 | 1/2001 | Miloslavsky et al. |
| 6,185,292 B1 | 2/2001 | Miloslavsky |
| 6,345,305 B1 | 2/2002 | Beck et al. |
| 6,366,668 B1 * | 4/2002 | Borst et al. ............. 379/266.04 |
| 6,373,836 B1 | 4/2002 | Deryugin et al. |
| 6,389,007 B1 | 5/2002 | Shenkman et al. |
| 6,393,015 B1 | 5/2002 | Shtivelman |
| 6,477,590 B1 | 11/2002 | Habusha et al. |
| 6,661,882 B1 * | 12/2003 | Muir et al. ............. 379/127.01 |
| 6,704,411 B1 * | 3/2004 | Nishidate ............... 379/265.09 |
| 6,732,156 B2 | 5/2004 | Miloslavsky |
| 6,798,877 B2 * | 9/2004 | Johnson et al. ........ 379/266.01 |
| 6,963,635 B1 * | 11/2005 | Jones .................... 379/114.14 |
| 6,968,368 B2 * | 11/2005 | Eitel et al. .................. 709/219 |
| 7,231,035 B2 * | 6/2007 | Walker et al. .......... 379/266.01 |
| 7,233,980 B1 * | 6/2007 | Holden et al. ............... 709/219 |
| 7,257,217 B1 * | 8/2007 | Lee ....................... 379/265.01 |

(Continued)

*Primary Examiner*—Gerald Gauthier

(57) ABSTRACT

A method and apparatus are provided for storing data from an automatic contact distributor for access through the Internet. The method includes the steps of transferring information from a first resource of the automatic contact distributor to a database through the Internet where the transferred information is encoded within SIP messages and where the transferred information related to a predetermined service that the first resource has performed for a second resource of the automatic contact distributor, compiling and storing the transferred information in a data file of the database where the data file is indexed by a file identifier and retrieving the information from the database by a third resource of the automatic contract distributor using the file identifier.

48 Claims, 1 Drawing Sheet

U.S. PATENT DOCUMENTS

| | | | |
|---|---|---|---|
| 7,450,828 B2 * | 11/2008 | Tanaka et al. | 386/125 |
| 7,542,561 B1 * | 6/2009 | Jabbour et al. | 379/265.01 |
| 2001/0046234 A1 | 11/2001 | Agrawal et al. | |
| 2002/0159475 A1 * | 10/2002 | Hung et al. | 370/465 |
| 2002/0191590 A1 | 12/2002 | Niu et al. | |
| 2003/0185379 A1 * | 10/2003 | O'Connor et al. | 379/265.02 |
| 2003/0187992 A1 | 10/2003 | Steenfeldt et al. | |
| 2004/0024879 A1 | 2/2004 | Dingman et al. | |
| 2004/0054805 A1 * | 3/2004 | Sen et al. | 709/240 |
| 2004/0086102 A1 | 5/2004 | McMurry et al. | |
| 2004/0114575 A1 * | 6/2004 | Morita et al. | 370/352 |
| 2005/0044188 A1 * | 2/2005 | Nakazawa et al. | 709/219 |
| 2005/0195960 A1 * | 9/2005 | Shaffer et al. | 379/265.02 |
| 2006/0036607 A1 * | 2/2006 | Hollatz | 707/10 |
| 2006/0106839 A1 * | 5/2006 | Shen et al. | 707/101 |
| 2008/0040461 A1 * | 2/2008 | Kumbalimutt et al. | 709/221 |

* cited by examiner

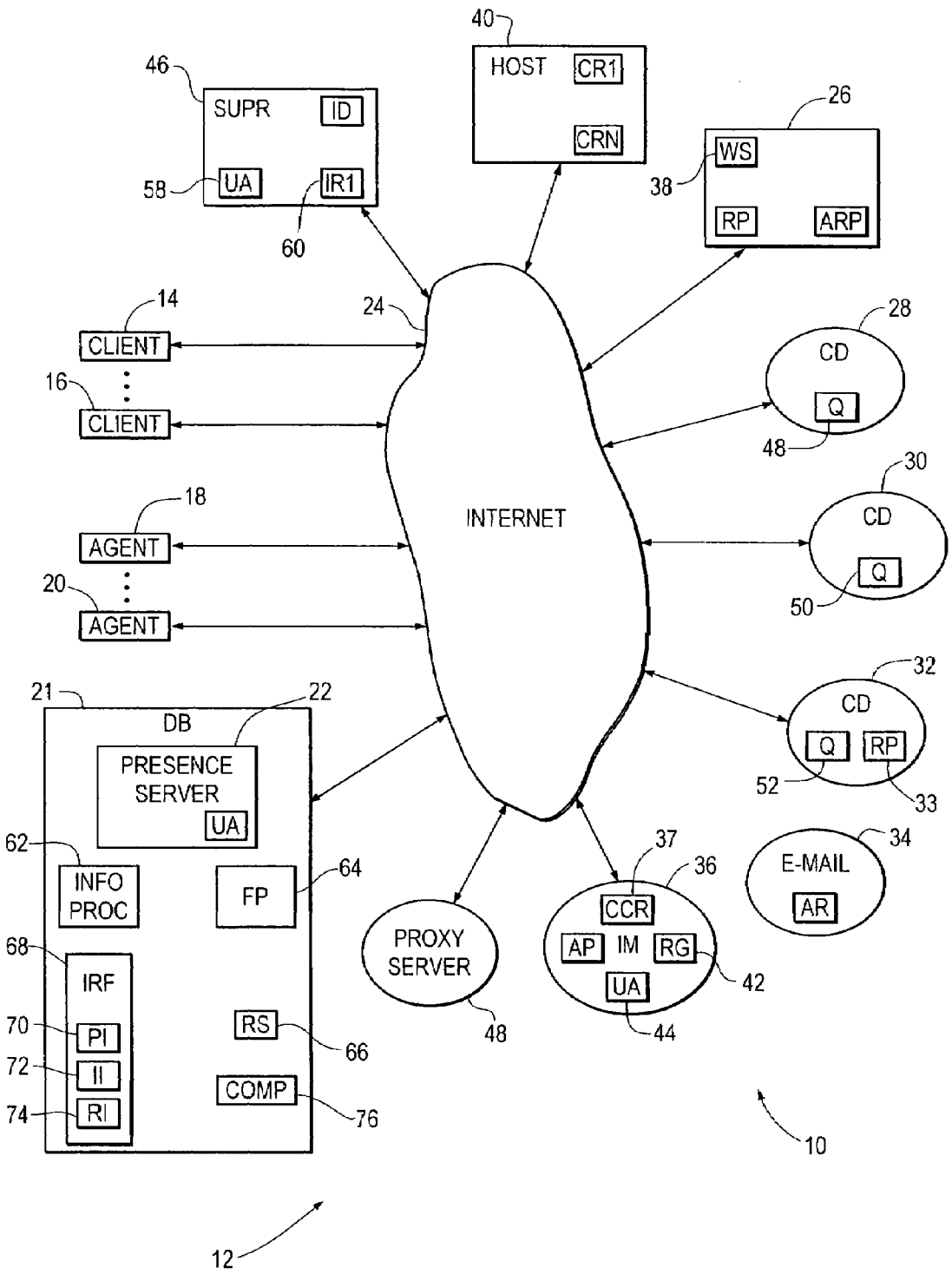

US 7,702,094 B2

METHOD OF STORING INFORMATION WITHIN AN ACD

FIELD OF THE INVENTION

The field of the invention relates to computer systems and more particularly, to automatic call distributors.

BACKGROUND OF THE INVENTION

Automatic call distributors (ACDs) are known. Such systems are typically used by organizations to serve large numbers of callers through the Public Switched Telephone Network (PSTN). Typically, inbound calls are directed to a common telephone number of the organization and distributed to agents based upon some criteria (e.g., agent idle time).

In addition to handling inbound calls, ACDs may also process outbound calls. Typically, a controller monitors a workload of its agents. Where a workload of received calls falls below some threshold value, the controller may begin to initiate outbound calls.

In addition to placing and distributing calls, an ACD may also identify and display documents on agent terminals as an aid to processing the calls. In the case of incoming calls, the calls may be received along with dialed number identification service (DNIS) and/or automatic number identification (ANI) information. ANI may be used to identify a caller at the same instant as the call is delivered to the ACD. The controller of the ACD may use the ANI information to retrieve and display customer records on a terminal of the agent selected to handle the call at the same instant that the call is delivered to the agent.

In addition, textual information may be displayed on a terminal of the agent that guides the agent through a sales presentation. DNIS information may be used to identify an intended call target and to select an appropriate sales presentation for use by the agent based upon the intended call target.

While automatic call distributors work relatively well, they are not particularly well suited to the Internet. The standards that are used for processing switched circuit calls and exchanging control information through the PSTN cannot be used within the Internet. Often the elements of Internet contact distributors are distributed to geographically diverse locations. As a result, management of resources becomes much more difficult due to the cumulative delays associated with obtaining information through the Internet. Because of the importance of contact centers, a need exists for a method and apparatus for expediting the availability of information from disparate information resources through the Internet.

SUMMARY

A method and apparatus are provided for storing data from an automatic contact distributor for access through the Internet. The method includes the steps of transferring information from a first resource of the automatic contact distributor to a database through the Internet where the transferred information is encoded within a SIP REGISTER message and where the transferred information relates to a predetermined service that the first resource has performed for a second resource of the automatic contact distributor, storing the transferred information in a data file of the database where the data file is indexed by a file identifier and retrieving the information from the database by a third resource of the automatic contract distributor using the file identifier.

BRIEF DESCRIPTION OF THE DRAWINGS

FIG. 1 is a block diagram of a contact distribution system in accordance with an illustrated embodiment of the invention.

DETAILED DESCRIPTION OF AN ILLUSTRATED EMBODIMENT

FIG. 1 is a block diagram of a contact distribution system 10 shown under an illustrated embodiment of the invention. The contact distribution system may be used for connecting contacts through the Internet 24 between clients 14, 16 and agents 18, 20. In general, the system 10 may be used by any of a number of different enterprise organizations (e.g., commercial, environmental, political, etc.) to advance the agenda of the enterprise.

The contact distribution system 10 may include a number of computer resources 18, 20, 26, 28, 30, 32, 34, 36 that function to form the connections between clients and agents. Also shown in FIG. 1 is a message system 12 that may be used to accumulate and disseminate transient information within the contact distribution system 10. The accumulation of transient information allows a user to deactivate his terminal and, later, reactivate his terminal without losing information that would otherwise not be saved within the contact distribution system 10.

As used herein, a computer resource of the organization is a computer application or processor that processes information that is directly related to enterprise operations of the organization. Using the Open Systems Interconnection (OSI) network model, a computer resource is a user application that operates from Layer 7 of the OSI model.

As described below, at least some of the computer resources 18, 20, 26, 28, 30, 32, 34, 36 perform predetermined services for other computer resources in furtherance of enterprise objectives. As used herein, a predetermined service performed by one resource for another means the processing of data to achieve some enterprise result that is not directly related to communication connections through the Internet.

Access to the contact distribution system 10 of the organization by clients 14, 16 of the organization may be provided through the Internet 24 under any of a number of different processes. In order to promulgate the agenda of the organization to its clients 14, 16, the organization may publish contact information (e.g., e-mail addresses, instant message (IM) addresses or universal resource locators (URLs)), by advertising or otherwise, that identifies communication paths to the organization.

Under the illustrated embodiment, the contact distribution system 10 may include one or more servers 26, 34, 36 that may function to receive and initially process contacts. A first server 34 may receive contacts in the form of e-mails. A second server 36 may receive contacts under an Instant Messaging (IM) format. A third multi-mode server 26 may receive contacts from one or more webpages downloaded to clients 14, 16 from a website 38 of the multi-mode server 26.

In the case where the organization is a manufacturer with many different products, a different e-mail address may be provided for each different product line. As such, the e-mail server 34 may receive e-mails directed to many different addresses that are all within one or more domain names used by the e-mail server 34. The use of different destination addresses may be used to provide the system 10 with a first level indication of the contact type of the received contact. The IM server 36 and multi-mode server 26 may be used in a similar manner.

Contacts processed by the servers 26, 34, 36 may be initiated in any of a number of different ways. For example, a contact from a client 14, 16 to the multi-mode server 26 may be initiated by activation of a SPEAK WITH AGENT softkey on a webpage downloaded from the multi-mode server 26. Alternatively, contacts from clients 14, 16 may by initiated in response to pop-up ads posted to websites visited by clients 14, 16. Contacts may also be initiated conventionally by a client 14, 16 activating an appropriate application (e.g., Outlook by Microsoft) and entering a Universal Resource Locator (URL) of the organization under an e-mail or IM format in response to a printed ad in a newspaper or magazine.

Contacts from clients 14, 16, received by the servers 26, 34, 36 may be distributed to agents 18, 20 through a number of contact distributors 28, 30, 32. As the contacts arrive, the server 26, 34, 36 receiving the contact may open a file for each contact identified by a unique contact identifier. The file may include at least a source identifier (e.g., an e-mail address, URL, etc.) of the client 14, 16 originating the contact and a destination identifier that identifies the contact destination (e.g., e-mail address, URL, etc.) within the system 10. In the case of contacts received by the multi-mode server 26, information regarding any webpages visited may also be included within the contact file.

A copy of each contact file may be transferred to the host 40. Within the host 40, the information within the contact file may be used to identify further information about the caller. For example, the source identifier may be used to classify the contact as originating from existing or new customers. Information on webpages visited or on prior contacts with the client 14, 16 may be used to provide and locate information regarding the type of contact involved.

Any additional information regarding the contact may be transferred back to the server 26, 34, 36. Within the server 26, 34, 36, the information within the contact file and, possibly, any additional information from the host 26 may be used within a contact classification application 37 to further classify the contact into one or more contact types.

Once a contact type has been determined, the server 26, 34, 36 may transfer the contact to a contact distributor 28, 30, 32. The contact distributor 28, 30, 32 that the server 26, 34, 36 selects to handle the contact may be based upon availability or upon the contact type.

Selection of a contact distributor 28, 30, 32 may be based simply upon status or upon some predetermined criteria. For example, the first contact distributor 28 may be associated with agents 18, 20 who are primarily skilled at handling contacts of a first contact type and who have secondary skills in handling contacts of a second type and third contact type. Similarly, the second contact distributor 30 may be associated with agents 18, 20 who are primarily skilled at handling contacts of a second contact type and who have secondary skills in handling contacts of a first type and third contact type and the third contact distributor 32 may be associated with agents 18, 20 who are primarily skilled at handling contacts of a third contact type and have secondary skills in handling contacts of a first type and second contact type.

As such, contacts of the first contact type will normally be transferred to the first contact distributor 28, contacts of the second contact type will be transferred to the second contact distributor 30 and contacts of the third contact type will be transferred to the third contact distributor 32. However, if one or more of the contact distributors 28, 30, 32 is inoperative or otherwise unavailable or is overloaded, then contacts may be handled by any other contact distributor 28, 30, 32.

If the primary contact distributor 28, 30, 32 is available, then the server 26, 34, 36 may transfer the contact along with the file to the appropriate contact distributor 28, 30, 32. Within the contact distributor 28, 30, 32, a contact routing application 33 may compare the contents of the contact file with a list of agent skills and may assign the contact to a qualified agent 18, 20. If an agent is not available, then the agent selection processor may place the contact in a contact queue 48, 50, 52 pending availability of a qualified agent.

The system 10 may be operated under the control of one or more supervisors working at one or more supervisor stations 46. Through the supervisors terminal 46, the supervisor may monitor the volume of incoming and outgoing contacts, the agents 18, 20 available for handling the contacts and the number of visitors to the web site 38.

As an incoming contact volume or mix of contacts changes, the supervisor working through the station 46 may add resources (e.g., agents) or shift contacts among the contact distributors 28, 30, 32 or agents 18, 20 among contact types to equalize the loading among the resources of the contact distribution system 10.

In order to properly supervise the system 10, the supervisor 46 may find it important to have ready access to system data. System data, in this case, means the number and types of contacts handled per time period (e.g., per one-quarter hour) by the system. System data may also mean the contacts handled per time period for each contact distributor 28, 30, 32 as well as real time data on queue length. System data for the multi-mode server 26 may include web site visitors per time period and the number and source of contacts. System data from the e-mail server 34 and IM server 36 may include contacts per time period and a listing of contact destinations. System data from the agents 18, 20 may include contacts handled per time period and an average contact handling time. System data from the host 40 may include total contacts per time period and the number of new clients versus existing clients.

Under illustrated embodiments of the invention, the collection of system data may be automated and centralized. Automation of the collection of system data reduces the load upon data users, reduces response time and increases flexibility.

Turning now to the apparatus 12 for collecting and disseminating transient information, an explanation will be provided as to how the system 10 functions to collect and store status information within a message database 21. Following the explanation of how the system 10 collects and stores information, an explanation will be provided as to how information users (e.g. supervisor terminal 46) retrieves the stored information.

Under illustrated embodiments, each resource 18, 20, 26, 28, 30, 32, 34, 36, 48 may be provided with a reporting application 42 and a user agent 44. The reporting application 42 may periodically collect reported information from within a respective resource 18, 20, 26, 28, 30, 32, 34, 36, 48 and format the information for transfer to a presence server 22 disposed within a message database 21 through the associated user agent 44.

The presence server 22 may have substantially the same functionality as presence servers defined by the Internet Engineering Task Force (IETF) in RFC #3261 in the context of Session Initiation Protocol (SIP). The presence server 22 functions to receive and save SIP REGISTRATION messages (as defined by RFC #3261) for the benefit of subscribers (as also defined by RFC #3261).

In this regard, the reporting application 42 within each respective resource 18, 20, 26, 28, 30, 32, 34, 36, 48 may collect reported information and forward the collected information to the associated user agent 44 of the resource 18, 20, 26, 28, 30, 32, 34, 36, 48. Reported information in the case of the e-mail server 34 may include the number of e-mails per time period and the number of e-mails per e-mail type (e.g., based upon e-mail address or e-mail content, etc.). In the case of the multi-mode server 26, the collected information may include the number of visitors per time period to the website 38, the number of requests for contact with an agent and possibly the number of contacts per contact type (e.g., based upon the content of the webpages visited).

With regard to the contact distributors 28, 30, 32, the reported status information may include the number of contacts handled per time period by the contact center 28, 30, 32, the number of contacts in each contact queue, the average speed of answer and the number of abandoned contacts. The reported information from the host 40 may include the overall number of contacts handled per time period, the number of new clients, and the subject matter of the contacts. The reported status information from the agents 18, 20 may include sign-in, sign-out information, the number of contacts handled per time period and the average length of each contact.

Reported information collected by the reporting application 42 of the resources 18, 20, 26, 28, 30, 32, 34, 36, 48 may be transferred to the associated user agent 44 where the reported information is encoded into a SIP REGISTER message and periodically forwarded to the presence server 22. In the case of an agent "Mary" working at an agent station (e.g., 18), the SIP REGISTER message may have the format as follows:

REGISTER sip: registrar@contactcenter.com SIP/2.0
Contact: sip:Mary@contactcenter.com; contacts_handled=5; Available=yes; average_talk_time=3:01
Contact-Length=0.

The SIP REGISTER messages from the resources 18, 20, 26, 28, 30, 32, 34, 36, 48 may be received by the register server 22 and saved locally in a respective file within memory of the PRESENCE server 22. The information of the respective files may be accessed in real-time by respective SIP WATCHERS (as defined by IETF #2778) and/or by an information processor 62 for purposes described below.

Under illustrated embodiments, the information processor 62 collects data from the SIP REGISTER messages and compiles the information into a message and statistics database of information received by the PRESENCE server 22 from sources both within and from outside of the system 10. In effect, the SIP PRESENCE server 21 functions as a front end real-time server and the information processor 62 functions as a back end server that compiles real-time and historical data that may subsequently be made available to SIP WATCHERS.

In this regard, the information server 62 may attach a time stamp to the data of each SIP REGISTER message and compile the data based upon source and time of arrival. In the case of the contact distributors 28, 30, 32, the reporting application 42 may periodically (e.g., once every minute) send a SIP REGISTER message containing the contact header "QUEUE1=X", where the value "X" is the queue length in contacts at that instant of time. The information processor 62 may attach a time stamp to the queue value and compile the value into a file that defines a histogram of readings from that contact distributor 28, 30, 32.

The SIP WATCHER (e.g., the supervisor 46) may periodically retrieve and display the collected information. Retrieval of the collected information may be performed manually or automatically under the control of an information retrieval interface application 60. In either case, retrieval of information may be performed through the use of a SIP SUBSCRIBE message.

To retrieve collected information, the supervisor may enter an identifier of a resource 18, 20, 26, 28, 30, 32, 34, 36, 48 and a desired time interval into the information retrieval interface 60 at the supervisors terminal 46. Entry of a resource identifier and time interval causes the interface 60, operating in conjunction with the associated user agent 58, to generate a SIP SUBSCRIBE message. In the case of the agent "Mary", the SIP SUBSCRIBE message may have the form as follows:

SUBSCRIBE sip: registrar@contactcenter.com SIP/2.0
From: supervisor@contactcenter.com
Contact: sip:Mary@contactcenter.com;
contacts_handled;
  Available; average_talk_time; startime1=A; endtime=B
Contact-Length=0.

Alternatively, the contact header of the SIP SUBSCRIBE message may be truncated if the supervisor were to desire some subset of Mary's reported information.

The SIP SUBSCRIBE message may be received by the presence server 22 and transferred to a formatting processor 64. The formatting processor 64 may decode the SIP SUBSCRIBE message, identify Mary as the information source, decode the types of information requested and the time interval and retrieve the requested information. The formatting processor 64 may forward the retrieved information to the PRESENCE SERVER 22 that, in turn, may respond with one or more SIP NOTIFY messages forwarding the reported information to the supervisors terminal 46. In the case of the agent Mary, the SIP NOTIFY message for the first time interval "A" may have the format as follows:

NOTIFY sip: supervisor@contactcenter.com SIP/2.0
Contact: sip:Mary@contactcenter.com; contacts_handled=5; Available=yes; average_talk_time=3:01; time=A
Contact-Length=0.

A second message may contain data for a second interval "A+1". Alternatively, the data may be combined into a single SIP NOTIFY message with data for each interval separated by the collection time.

Using the SIP REGISTER, SUBSCRIBE and NOTIFY messages, the supervisor 46 may obtain reported information from one or more or from all of the resources 18, 20, 26, 28, 30, 32, 34, 36, 48. Further, the supervisor terminal 46 may retrieve the information piecemeal or may subscribe to receive the information on a real-time basis as it is received by the presence server 22.

The use of the SIP REGISTER, SUBSCRIBE and NOTIFY messages allow the reported information to be cached in a system location that is not subject to the reporting difficulties of the information sources. For example, reported information may be forwarded from the resources 18, 20, 26, 28, 30, 32, 34, 36, 48 to the presence server 22 on a regular basis as the reported information is collected at the source.

Once collected, the supervisor may request the information as needed (each time the supervisor station 46 is activated) or may activate reporting applications that subscribe and collect the information in real time. Once collected, the reporting applications may provide and maintain an overall view of the contact center 10 that reflects a current agent and call flow state.

In another illustrated embodiment, the message system 12 may be used to capture additional message formats from inside or even from outside of the system 10 based upon a predetermined criteria and deliver the messages automatically and sequentially to a predetermined destination (e.g., terminal) of the organization. Such a feature may be used in the case where a resource becomes deactivated for a period followed by reconnection. An example of such a situation may be an agent 18, 20 who specializes in handling a particular type of e-mail distributed by the e-mail server 34 through a contact distributor (e.g., 32). In this case, the supervisor may provide the predetermined criteria that is saved in the database for the agent and that identifies the particular type of message (e.g., e-mail) that is forwarded to the agent 18, 20.

The accumulation of messages by the message system 12 may be accomplished by any of a number of different methods. Under a first method, the contact distributor 32 may forward e-mails to agents 18, 20 (e.g., "Mary@contactcenter.com") using a SIP INVITE.

If the agent 18, 20 does not respond with a "SIP/2.0 180 Ringing" or "SIP/2.0 200 OK" message within a predetermined time period, then the contact distributor 32 may forward the e-mail to the message system 12 encapsulated in a SIP INVITE message. The e-mail messages may be encoded as follows.

INVITE sip: registrar@contactcenter.com SIP/2.0 Contact: Mary@contactcenter.com SIP/2.0;
E-mail_address=Joe@foo.com;
E-mail_body=Can you help me with my account?.

As shown, an e-mail address of the source may be encoded immediately after the contact header "e-mail_address". The e-mail message may be encoded immediately after the contact header "e-mail_body".

Upon receipt of the SIP INVITE message, the information processor 62 may create a file for the message. As each new SIP INVITE message is received, it may be added to the file.

Alternatively, each agent 18, 20 may periodically (e.g., every 5 seconds) send SIP REGISTER messages to the SIP PRESENCE server 22. The contact distributor 32 may send a SIP SUBSCRIBE message (and receive a NOTIFY message) verifying the presence of the agent 18, 20 before assigning an e-mail to the agent. As above, if the contact distributor 32 does not receive a NOTIFY message, then the contact distributor 32 sends the e-mail message to the presence server 22 encapsulated as described above.

To recover any messages from the message system 12, the agent 18, 20 (e.g., Mary) may automatically send a SIP REGISTER message to the message system 21. The SIP REGISTRATION message may have the form as follows.

REGISTER sip: registrar@contactcenter.com SIP/2.0 Contact: Mary@contactcenter.com SIP/2.0;
E-mail_address; E-mail_body.

The message may be received by the information processor 62. The information processor 62 may detect the message as being a request for messages by the absence of content in the "E-mail_address" and/or "E-mail_body" fields. In response, the information processor 62 instructs a re-sync processor 66 to retrieve the file and forward the file's contents to the agent 18, 20. The file may be forwarded one entry at a time within a SIP NOTIFY message with the e-mails encapsulated as shown above.

Alternatively, the database 12 may contain an information reporting file 68 that provides the predetermined criteria for forwarding information to the agent or other party within the system 10. In this case, the reporting file 68 may be created by a supervisor or by the party requesting the information. The file may contain a party identifier 70 (e.g., an agent 18), one or more information identifiers 72 and a reporting interval 74.

During normal operation, the agent 18 may periodically send a SIP REGISTER message to the database 21. The SIP REGISTER message may contain an identifier of the file as a target of the registration message. The information processor 62 may periodically retrieve the criteria and forward the criteria to a comparator 76 where the criteria is compared with information availability and where the criteria meets the information availability, the information is forwarded to the subscribing party encoded within a SIP NOTIFY message.

To use the information reporting file 68, the requesting party (e.g., agent 18) may periodically subscribe with the database using a SIP SUBSCRIBE message. The information processor 62 may forward the requested information based upon the criteria.

If the agent 18 should not respond with a SIP REGISTER message, then the information processor 62 may begin to accumulate the information identified by the reporting file 62. The accumulation may continue until the agent 18 again registers. Once the agent 18 registers, then the information processor 62 may begin to download any accumulated information within one or more SIP INVITE messages.

A specific embodiment of method and apparatus for storing information regarding the availability of resources of a computer system has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of storing data from an automatic contact distributor for access through the Internet, such method comprising the steps of:
    transferring information from a first resource of the automatic contact distributor to a presence server database where the transferred information is encoded within SIP messages and where the transferred information relates to a predetermined criteria of the automatic contact distributor;
    compiling the transferred information from a plurality of the SIP messages;
    storing the compiled transferred information in a data file of the database based upon the predetermined criteria where the data file is indexed by a file identifier; and
    retrieving the compiled, transferred information from the database and delivering the information to a predetermined resource of the automatic contact distributor using the file identifier.

2. The method of storing data as in claim 1 further comprising indexing the stored file using an identifier of the first resource.

3. The method of storing data as in claim 1 further comprising indexing the stored information with a temporal indicator.

4. The method of storing data as in claim 1 wherein the step of storing the transferred information further comprises attaching a time stamp to the stored information.

5. The method of storing data as in claim 2 wherein the step of retrieving further comprises sending a SIP SUBSCRIBE message to the database containing indicia of identity of the stored information.

6. The method of storing data as in claim 5 wherein the step of sending a SIP SUBSCRIBE message further comprises the database downloading the stored information within a SIP NOTIFY message.

7. The method of storing data as in claim 1 wherein the step of retrieving the information from the database further comprises the third resource sending a SIP REGISTER message to the database.

8. The method of storing data as in claim 7 further comprising providing a predetermined criteria of files stored within the database that are to be downloaded to the third resource.

9. The method of storing data as in claim 8 further comprising upon detection of a SIP REGISTER message from the third resource comparing the predetermined criteria with a set of attributes of the stored file and downloading the stored file to the third resource when the attributes of the stored file match the predetermined criteria.

10. The method of storing data as in claim 1 wherein the stored data further comprises at least one of the group consisting of statistics, contact arrival rates, agent sign-in time, agent sign-out time.

11. The method of storing data as in claim 1 wherein the stored data further comprises an e-mail.

12. The method of storing data as in claim 1 wherein the stored data further comprises an instant message.

13. An apparatus for storing data from an automatic contact distributor for access through the Internet, such apparatus comprising:
means for transferring information from a first resource of the automatic contact distributor to a presence server database through the Internet where the transferred information is encoded within SIP messages and where the transferred information relates to a predetermined criteria of the automatic contact distributor;
compiling the transferred information from a plurality of the SIP messages;
means for storing the compiled transferred information in a data file of the database based upon the predetermined criteria where the data file is indexed by a file identifier; and
means for retrieving the compiled information from the database by a third resource of the automatic contact distributor using the file identifier.

14. The apparatus for storing data as in claim 13 further comprising means for indexing the stored file using an identifier of the first resource.

15. The apparatus for storing data as in claim 13 further comprising means for indexing the stored information with a temporal indicator.

16. The apparatus for storing data as in claim 13 wherein the means for storing the transferred information further comprises attaching a time stamp to the stored information.

17. The apparatus for storing data as in claim 14 wherein the step of retrieving further comprises means for sending a SIP SUBSCRIBE message to the database containing indicia of identity of the stored information.

18. The apparatus for storing data as in claim 17 wherein the step of sending a SIP SUBSCRIBE message further comprises means within the database for downloading the stored information within a SIP NOTIFY message.

19. The apparatus for storing data as in claim 13 wherein the means for retrieving the information from the database further comprises means within the third resource for sending a SIP REGISTER message to the database.

20. The apparatus for storing data as in claim 19 further comprising means for providing a predetermined criteria of files stored within the database that are to be downloaded to the third resource.

21. The apparatus for storing data as in claim 20 further comprising means for comparing the predetermined criteria with a set of attributes of the stored file and downloading the stored file to the third resource when the attributes of the stored file match the predetermined criteria.

22. The apparatus for storing data as in claim 13 wherein the stored data further comprises at least one of the group consisting of statistics, contact arrival rates, agent sign-in time, agent sign-out time.

23. The apparatus for storing data as in claim 13 wherein the stored data further comprises an e-mail.

24. The apparatus for storing data as in claim 13 wherein the stored data further comprises an instant message.

25. An apparatus for storing data from an automatic contact distributor for access through the Internet, such apparatus comprising:
SIP messages that transfer information from a first resource of the automatic contact distributor to a presence server database based upon a predetermined criteria where the transferred information is encoded within the SIP messages;
the database that compiles the transferred information from a plurality of the SIP messages and stores the compiled transferred information in a data file of the database where the data file is indexed by a file identifier; and
a re-sync processor that retrieves the compiled transferred information from the database for use by a second resource of the automatic contact distributor using the file identifier.

26. The apparatus for storing data as in claim 25 wherein the indexing of the file further comprises an identifier of the first resource.

27. The apparatus for storing data as in claim 25 wherein the indexing of the file further comprises a temporal indicator.

28. The apparatus for storing data as in claim 25 wherein the file further comprises a time stamp attached to the stored information.

29. The apparatus for storing data as in claim 25 further comprising a SIP SUBSCRIBE message that is sent to the database by the third resource containing indicia of identity of the stored information.

30. The apparatus for storing data as in claim 29 further comprising a SIP NOTIFY messages that is downloads the stored information to the third resource.

31. The apparatus for storing data as in claim 25 further comprising a user agent within the third resource that sends a SIP REGISTER message to the database.

32. The apparatus for storing data as in claim 31 wherein the database further comprises a predetermined criteria of files that are stored within the database that are to be downloaded to the third resource.

33. The apparatus for storing data as in claim 32 further comprising a comparator that compares the predetermined criteria with a set of attributes of the stored file and downloading the stored file to the third resource when the attributes of the stored file match the predetermined criteria.

34. The apparatus for storing data as in claim 25 wherein the stored data further comprises at least one of the group consisting of statistics, contact arrival rates, agent sign-in time, agent sign-out time.

35. The apparatus for storing data as in claim 25 wherein the stored data further comprises an e-mail.

36. The apparatus for storing data as in claim 25 wherein the stored data further comprises an instant message.

37. A method of storing data from an automatic contact distributor for access through the Internet, such method comprising the steps of:

transferring information from a first resource of the automatic contact distributor to a database of a SIP presence server based upon a predetermined criteria where the transferred information is encoded within SIP INVITE messages and relates to a predetermined service that the first resource has performed for a second resource of the automatic contact distributor;

compiling the transferred information from a plurality of the SIP INVITE messages;

storing the compiled transferred information in a data file of the database based upon the predetermined criteria where the data file is indexed by a file identifier;

retrieving the compiled transferred information from the database using the file identifier; and transferring the retrieved information to a third resource of the automatic contact distributor encoded within a SIP NOTIFY message.

38. The method of storing data as in claim 37 further comprising indexing the stored file using an identifier of the first resource.

39. The method of storing data as in claim 37 further comprising indexing the stored information with a temporal indicator.

40. The method of storing data as in claim 37 wherein the step of storing the transferred information further comprises attaching a time stamp to the stored information.

41. The method of storing data as in claim 38 wherein the step of retrieving further comprises sending a SIP SUBSCRIBE message to the database containing indicia of identity of the stored information.

42. The method of storing data as in claim 41 wherein the step of sending a SIP SUBSCRIBE message further comprises the database downloading the stored information within a SIP NOTIFY message.

43. The method of storing data as in claim 37 wherein the step of retrieving the information from the database further comprises the third resource sending a SIP REGISTER message to the database.

44. The method of storing data as in claim 43 further comprising providing a predetermined criteria of files stored within the database that are to be downloaded to the third resource.

45. The method of storing data as in claim 44 further comprising upon detection of a SIP REGISTER message from the third resource comparing the predetermined criteria with a set of attributes of the stored file and downloading the stored file to the third resource when the attributes of the stored file match the predetermined criteria.

46. The method of storing data as in claim 37 wherein the stored data further comprises at least one of the group consisting of statistics, call arrival rates, agent sign-in time, agent sign-out time.

47. The method of storing data as in claim 37 wherein the stored data further comprises an e-mail.

48. The method of storing data as in claim 37 wherein the stored data further comprises an instant message.

* * * * *